US012536425B1

(12) United States Patent
Toth et al.

(10) Patent No.: US 12,536,425 B1
(45) Date of Patent: Jan. 27, 2026

(54) WHOLE BRAIN EMULATION SYSTEM

(71) Applicant: Eon Systems PBC, San Francisco, CA (US)

(72) Inventors: Viktor Toth, Budapest (HU); Connor Flexman, New York, NY (US); Aurelia Song, Vancouver, WA (US); Maximilian Jakob Schons, Saarbrucken (DE); Robert Bolkow, Berlin (DE); Michael Andregg, Boulder, CO (US); Alexander D. Wissner-Gross, Cambridge, MA (US)

(73) Assignee: Eon Systems PBC, San Francisco, CA (US)

( * ) Notice: Subject to any disclaimer, the term of this patent is extended or adjusted under 35 U.S.C. 154(b) by 0 days.

(21) Appl. No.: 19/078,199

(22) Filed: Mar. 12, 2025

Related U.S. Application Data

(60) Provisional application No. 63/564,403, filed on Mar. 12, 2024.

(51) Int. Cl.
  *G06N 3/063* (2023.01)
  *G06N 3/08* (2023.01)

(52) U.S. Cl.
  CPC .............. *G06N 3/063* (2013.01); *G06N 3/08* (2013.01)

(58) Field of Classification Search
  CPC .................................. G06N 3/063; G06N 3/08
  USPC ........................................................ 706/25
  See application file for complete search history.

(56) References Cited

U.S. PATENT DOCUMENTS

| 2017/0295359 A1* | 10/2017 | Cabral | H04N 13/156 |
| 2022/0022800 A1* | 1/2022 | Abrams | A61B 5/372 |
| 2023/0039900 A1* | 2/2023 | Wang | G06N 3/0464 |

OTHER PUBLICATIONS

Visual Decoding and Reconstruction via EEG Embeddings with Guided Diffusion, Li et al, Mar. 12, 2024 (Year: 2024).*
Dream Diffusion: Generating High-Quality Images from Brain EEG Signals, Bai et al, Jun. 30, 2023 (Year: 2023).*
Decoding Natural Images From EEG for Object Recognition, Song et al, Aug. 25, 2023 (Year: 2023).*

* cited by examiner

*Primary Examiner* — Austin Hicks
(74) *Attorney, Agent, or Firm* — Cognition IP, P.C.; Edward Steakley

(57) ABSTRACT

Systems and methods to allow for generating a simulated humanoid. The simulated humanoid operates in a simulation space with simulated humanoid having a whole brain emulation module. The whole brain emulation module includes a virtual stimuli input module that is configured to receive or capture stimuli input data. The whole brain emulation module includes an encoder that is configured to translate the stimuli input data into a simulated functional neurodata frame. The whole brain emulation module also includes a brain state module that maintains a current brain state corresponding to a current functional neurodata frame of the simulated humanoid.

22 Claims, 17 Drawing Sheets

WHOLE BRAIN EMULATION SYSTEM

CROSS-REFERENCE TO RELATED APPLICATIONS

This application claims the benefit of priority to U.S. Provisional Application No. 63/564,403, filed on Mar. 12, 2024, which is hereby incorporated by reference in its entirety.

FIELD

The present invention relates generally to systems and methods for the machine learning based training and simulation of whole brain, ensemble brain and/or nervous system emulation models.

BACKGROUND

Major national academic projects have digitally mapped neurobiological structures, including *C. elegans*, fruit flies, and segments of the human brain. Many projects across computational neuroscience aim to simulate progressively larger neural clusters in different ways. The primary objectives of these brain mapping initiatives overwhelmingly focus on generating structural and/or functional maps of neural connections and circuits in the brain. Early pioneering efforts concentrated more on molecular-level mapping.

SUMMARY

The system and methods described herein provide for the generation and virtual (simulated bodies) or physical (robotic bodies) embodiment of whole brain and whole organism emulation models. In some embodiments, emulation models may be generated for one or more organic, artificial and synthetic intelligence systems. The system may comprise a datastore and a server. The datastore may comprise one or more training datasets, wherein the one or more training datasets may comprise resting brain state datasets and stimulated brain state datasets. In some embodiments, the training datasets may further comprise structural and activity data. In some embodiments, the training datasets may include functional datasets, aligned function/behavior datasets, structural datasets, aligned structure/function datasets, aligned function/function datasets (e.g., calcium imaging to blood oxygen) and/or aligned structure to structure datasets (e.g., microscopy to nano scale resolution). In some embodiments, the training datasets may be generated synthetically.

In some embodiments, the datastore may further comprise one or more inference datasets, wherein the one or more inference datasets may comprise one or more tokenized versions of one or more whole brains, whole organisms, ensemble brain representations or other intelligent systems.

In some embodiments, the one or more training datasets further comprise a plurality of real brain scans. The plurality of real brain scans may be augmented with functional data, by a generative model, to synthetically generate one or more inference datasets.

The server may comprise a network module, one or more training modules, one or more machine learning modules and one or more intelligence emulation modules. In some embodiments, the one or more intelligence emulation modules may correspond to one or more simulated humanoids operating in a simulation space. In some embodiments, the intelligence emulation modules may correspond to whole brain emulations, ensemble brain emulations, whole organism emulations, synthetic/artificial intelligence systems (virtual and physical) emulations, robotic system emulations, or combination thereof. The server may further comprise one or more encoder modules, decoder modules, output modules, inference modules and feedback modules.

In some embodiments, the network module may be configured to receive the one or more training datasets from the datastore. The training module may be configured to retrieve, from the datastore, the one or more training datasets, wherein the one or more training datasets comprise functional neurodata frames and aligned external stimuli and train a next state prediction machine learning model based on the training datasets. The training module may further be configured to generate one or more predicted functional neurodata frames based on the next state prediction model and one or more encoded stimuli inputs. In some embodiments, an evaluation module may be configured to evaluate the accuracy of the generated one or more predicted functional neurodata frames. Based on the evaluation of the predicted functional neurodata frames, a data acquisition module may be configured to generate an acquisition plan corresponding to encoded stimuli inputs of predicted functional neurodata frames with an accuracy below a predetermined threshold value. In some embodiments, the data acquisition module may be configured to collect functional datasets, aligned function/behavior datasets, structural datasets, aligned structure/function datasets, aligned function/function datasets (e.g. calcium imaging to blood oxygen) and aligned structure to structure datasets (e.g. microscopy to nano scale resolution) based on the acquisition plan.

In some embodiments, the simulated humanoid or other intelligence emulation system may operate in the simulation space. The simulated humanoid may further comprise a whole brain emulation module. The whole brain emulation module may further comprise one or more virtual stimuli input modules, wherein the one or more virtual stimuli input modules may be configured to receive or capture stimuli input data. In some embodiments, the simulated humanoid may additionally or alternatively comprise one or more real world stimuli input modules.

In some embodiments, the simulated humanoid may further comprise one or more encoder modules, wherein the one or more encoder modules may be configured to translate the stimuli input data into a simulated functional neurodata frame.

In some embodiments, the simulated humanoid may further comprise one or more brain state modules, wherein the one or more brain state modules may comprise a current brain state corresponding to a current functional neurodata frame of the simulated humanoid and a trained next state prediction model, wherein the trained next state prediction model may be configured to generate an updated brain state based on a sequence of past brain states and simulated functional neurodata frames from the one or more encoder modules.

In some embodiments, the simulated humanoid may further comprise one or more decoder modules, wherein the one or more decoder modules may be configured to translate the updated brain state of the simulated humanoid into one or more intended behaviors. In some embodiments, each of the one or more decoder modules may be associated with a different behavior.

In some embodiments, the simulated humanoid may further comprise an output module, wherein the output module may be configured to generate one or more output behaviors, commands and/or instructions based on the one or more intended behaviors.

In some embodiments, the stimuli input data may comprise any one or more of the following: visual input to a person, audible input to a person, input to a person, taste input information, or other sensory input to the person. In some embodiments, the stimuli input data may correspond to data received from one or more networked physical brains, emulated brains, real or synthetic organisms, physical or virtual embodiments of intelligent systems or combination thereof.

In some embodiments, the stimuli input module may be a physical or virtual camera or microphone.

In some embodiments, the stimuli input module may be a computer brain interface.

In some embodiments, the stimuli data may comprise internal and external stimuli data.

In some embodiments, the stimuli data correspond to real world stimuli.

In some embodiments, the stimuli data correspond to synthetically generated stimuli.

In some embodiments, the functional neurodata frames may be representations of brain structure and function, wherein the representations correspond to a recording modality. The recording modality may comprise any one or more of the following: Electro-encephalography (EEG), functional Near-Infrared Spectroscopy (fNIRS), Magneto-encephalography (MEG), functional Magnetic Resonance Imaging (fMRI), functional Ultrasound (fUS), Electron Microscopy, Expansion Microscopy, Histological Data, MEA Spike Trains, $Ca^{2+}$ Imaging, voltage imaging or Fluorescence imaging.

In some embodiments, the output behaviors may comprise one or more of the following: generating textual output, generating image output, generating video output, generating actions or commands to maneuver a simulated person or generating speech.

In some embodiments, a portion of the output behaviors may be input back into the brain state module, to generate new output.

The appended claims may also serve as a summary of this application.

The features and components of these embodiments will be described in further detail in the description which follows. Additional features and advantages will also be set forth in the description which follows, and in part will be implicit from the description, or may be learned by the practice of the embodiments. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

Figure 1:
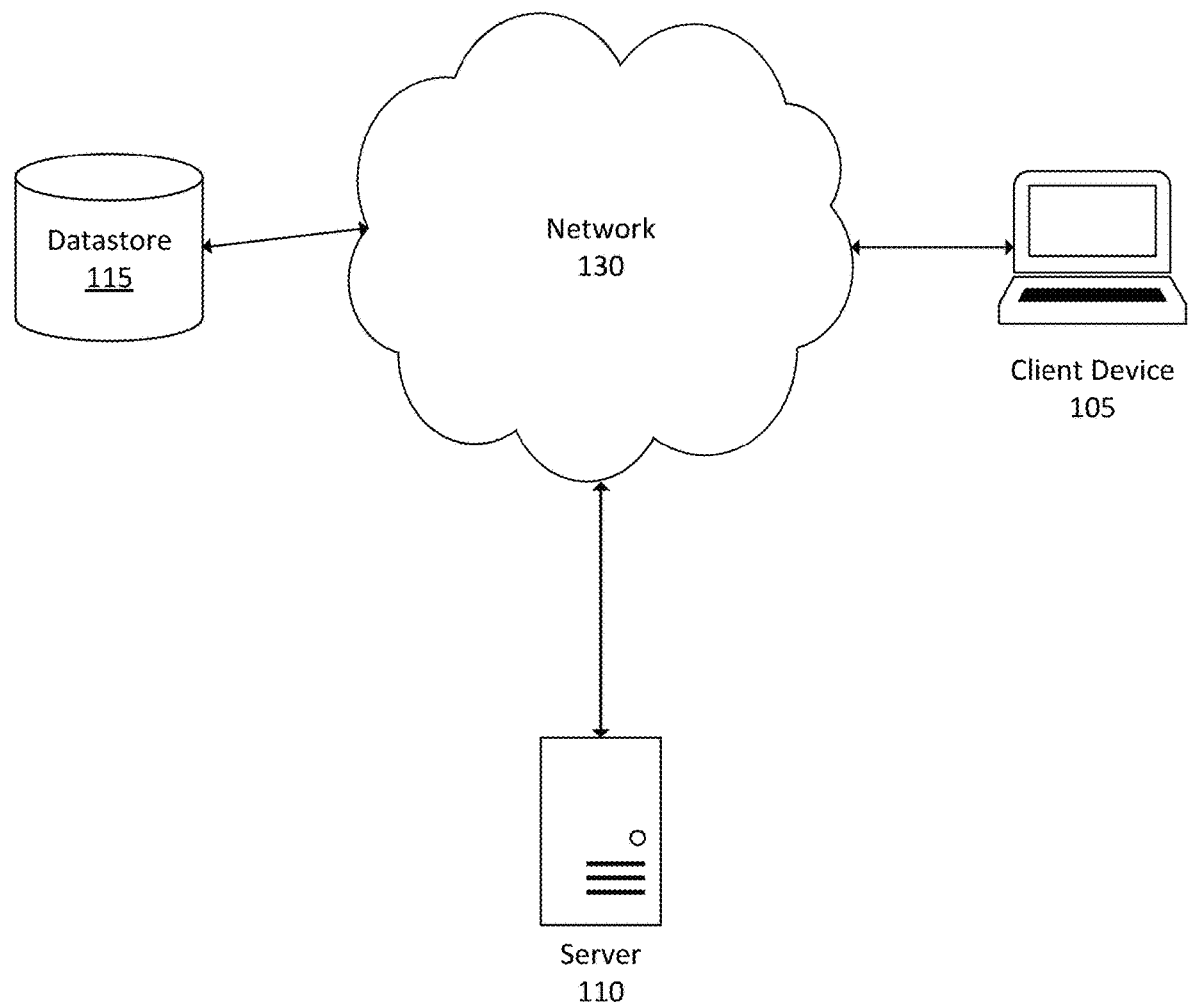
FIG. 1 is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality too, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

The following generally relates to a system, platform and methods for whole brain emulation, whole organism emulation, ensemble brain emulation, ensemble organism emulation, artificial/synthetic intelligence system emulation, intelligent robotic system emulation or general intelligence emulation. The intelligence emulation may correspond to interactions with physical or virtual environments. In some embodiments, the system may be configured to emulate human and non-human organisms at a variety of different scales. The system may use one or more machine learning (ML) and/or artificial intelligence (AI) models to simulate structures and functions of a brain, translation of stimuli, evolving and maintaining brain states and decoding behaviors.

In some embodiments, the system may be trained and operated as a behavioral model. In some embodiments, the behavioral model may be a behavioral whole brain model. The behavioral whole brain model (WBM) may be configured to emulate one or more organisms, including humans.

In some embodiments, the system may be trained on functional neurodata such as functional magnetic resonance imaging (fMRI) or functional ultrasound (fUS). Other modalities that may be used for training may comprise functional near-infrared spectroscopy (fNIRS), magnetoencephalography (MEG), functional magnetic resonance imaging (fMRI), functional ultrasound (fUS), electron microscopy, expansion microscopy, histological data, MEA spike trains, $Ca^{2+}$ imaging, fluorescence imaging or combination thereof.

In some embodiments, encoder models and decoder models may be trained separately from the WBM. The encoder model may be trained to encode sensory (stimuli) as activations into the WBM. The decoder model may be trained to decode activations into motor commands or other output behaviors.

In some embodiments, initial brain states of the WBM and of intelligence emulation modules in general may be generated synthetically.

In some embodiments, the general intelligence emulation system may be configured to interact with virtual environments, physical environments or combination thereof. In some embodiments, the emulation system may be configured to receive virtual stimuli and perform control operations of virtual output modules based on the received virtual stimuli. The received virtual stimuli may be encoded by one or more encoder modules, and the emulation system may generate one or more output behaviors, commands and/or instructions based on the virtual stimuli and the current cognitive state of the emulation system. One or more decoder modules may translate and facilitate the control of one or more virtual output devices based on the generated one or more output behaviors, commands and/or instructions.

In some embodiments, the emulation system may be configured to interact with a physical environment. Real world physical stimuli may be received from the physical environment and encoded by the encoder module. The emulation system may be configured to generate one or more behaviors based on the encoded stimuli. The one or more behaviors may be translated into control commands for one or more physical output devices by one or more decoder modules.

In some embodiments, emulation of an entire organism may further comprise emulation of the central nervous system (CNS) and peripheral nervous system (PNS). In some embodiments, the system may comprise one or more CNS modules and one or more PNS modules. Each of the CNS and PNS modules may comprise one or more trained machine learning models. In some embodiments, the CNS and PNS modules may further comprise modules corresponding to the emulation of additional nervous systems such as the autonomic nervous system (ANS), somatic nervous system (SNS), sympathetic nervous system (SymNS), parasympathetic nervous system (PSymNS) or enteric nervous system (ENS).

In some embodiments, the emulation system may receive as an input a body of text from an application (such as a word processing application, text editor, text file). The emulation system processes the body of text and generates the output behaviors, commands and/or instructions to interact with the application. The output behaviors, commands and/or instructions may cause actions to be taken with regard to the application where the system provides automation with respect to text editing operations.

In some embodiments, the emulation system may be configured to receive as input, stimuli corresponding to environmental output controlled based on the emulated behaviors of the emulation system. For example, the emulation system may control a word processing/text editing application to perform one or more text editing operations, such as typing of text, deleting of text, moving of a mouse cursor, copy/paste operations and formatting operations. The emulation system may observe the actions as they are performed in the environment and capture the interaction of the actions with the environment as input stimuli. The emulation system may iterate through a plurality of update/analyze/update cycles, where editing operations generated by the emulation system produce updates to the state of the environment, and analysis of the state and changes to the environment influence future emulated editing operations performed by the emulation system. In some embodiments, the number of iterations performed in the text generation operation may be predetermined. In other embodiments, the number of iterations may be determined dynamically and in real-time based on analysis performed by the emulation system.

FIG. 1 is a diagram illustrating a whole brain emulation system 100 in which some embodiments may operate. The whole brain emulation system 100 may comprise one or client devices 105, one or more servers 110, one or more datastores 115 and one or more networks 130.

Server 110 may be one or more physical or virtual machines configured to communicate with the one or more client devices 105 and the one or more datastores 115. The one or more servers 110 may be configured as a distributed computing infrastructure and processing of applications and other software may be carried out on the cloud.

Datastores 115 may communicate with one another over network 130. Datastores 115 may be any storage device capable of storing data for processing or as a result of processing information at the client devices 105 and/or servers 110. The datastores 115 may be a separate device or the same device as server 110. The datastores 115 may be located in the same location as that of server 110, or at separate locations.

Network 130 may be an intranet, internet, mesh, 3G, 4G, 5G, LTE, GSM, peer-to-peer or other communication network that allows the one or more servers 110 to communicate with the one or more client devices 105 and datastores 115. Any wireless or wired communication protocol or technology may be used as network 130.

Figure 2A:
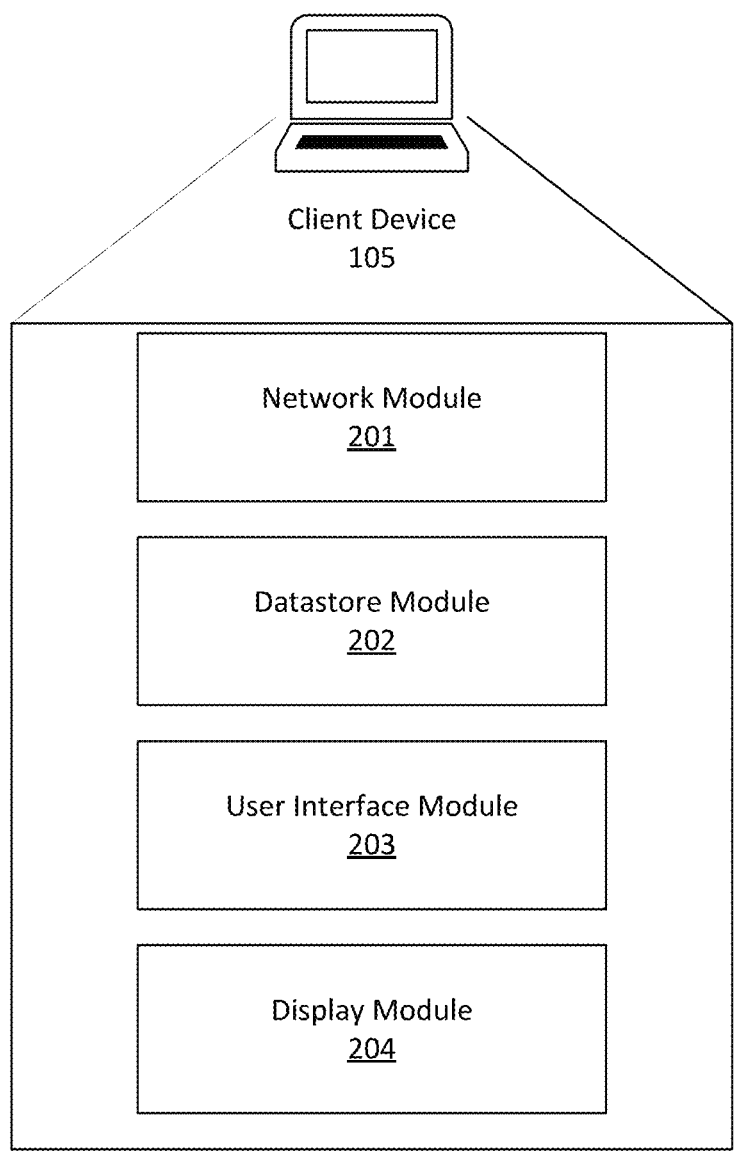
FIG. 2A is a diagram illustrating an exemplary client device in accordance with aspects of the present disclosure.

FIG. 2A is a diagram illustrating an exemplary client device 105 in accordance with aspects of the present disclosure. Client device may comprise network module 201, datastore module 202, user interface module 203 and display module 204.

Network module 201 may transmit and receive data from other computing systems via a network such as network 130 as described above with regard to FIG. 1. In some embodiments, the network module 201 may enable transmitting and receiving data from the Internet. Data received by the network module 201 may be used by the other modules. The modules may transmit data through the network module 201.

The datastore module 202 may be configured to store information generated by the one or more modules operating at the client device 105. The one or more modules operating at the client device 105 may also retrieve information from the datastore module 202.

User interface module 203 may be configured to generate an interactive visualization corresponding to the operation of the simulated humanoid. This interactive visualization may be displayed on display module 204.

Figure 2B:
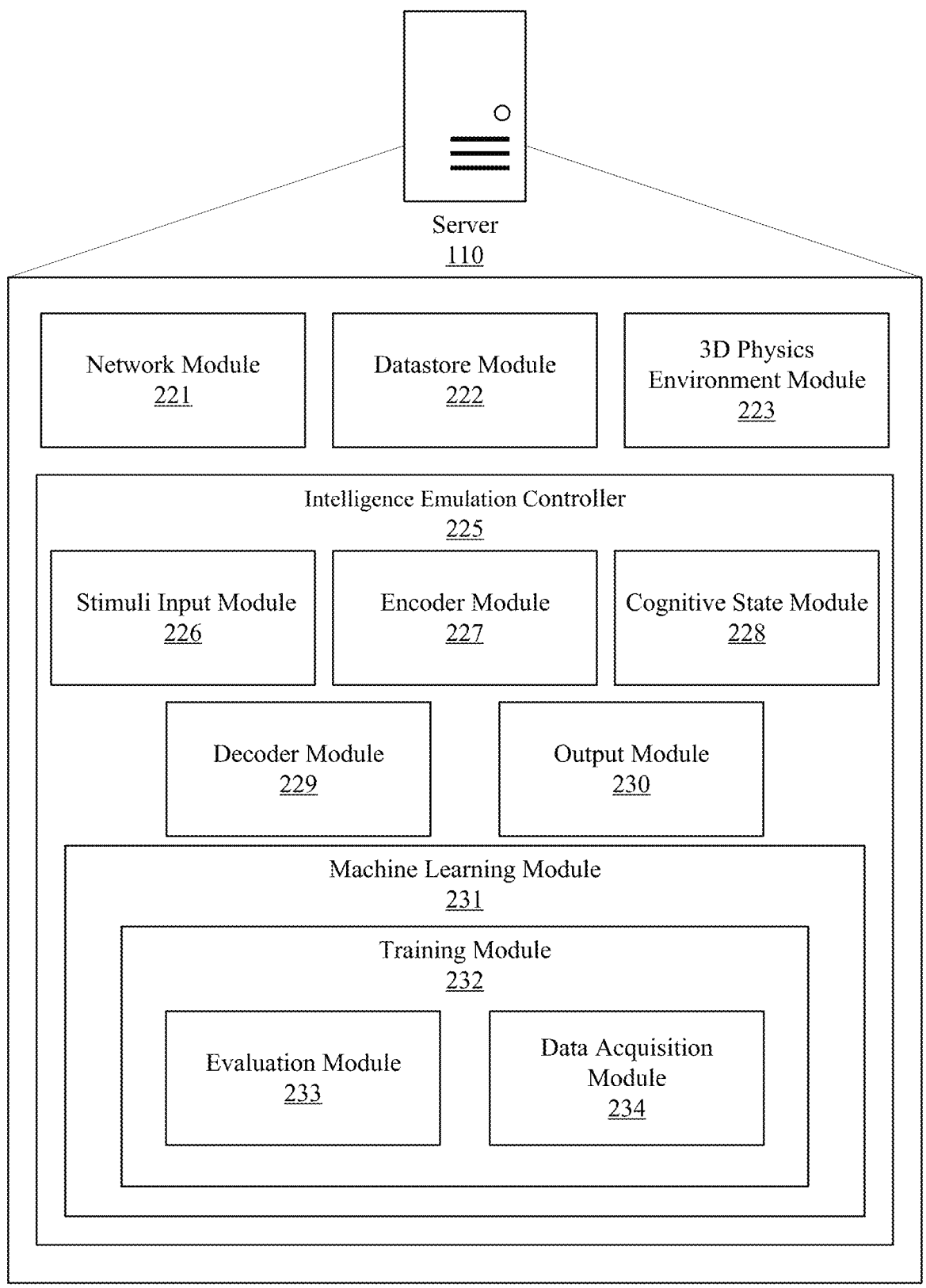
FIG. 2B is a diagram illustrating an exemplary server in accordance with aspects of the present disclosure.

FIG. 2B is a diagram illustrating an exemplary server 110 in accordance with aspects of the present disclosure. Server 110 may comprise network module 221, datastore module 222, intelligence emulation controller 225 and machine learning module 231.

Network module 221, may be the same or similar to that of network module 201 in FIG. 2A and will not be described for the sake of brevity.

Datastore module 222 may be configured to store information generated by the one or more modules operating on the server 110. The one or more modules operating on the server 110 may also retrieve information from the datastore module 202. Data received from the one or more datastores 115 over network module 221 may also be stored in datastore module 222.

Intelligence emulation controller 225 may further comprise stimuli input module 226, encoder module 227, cognitive state module 228, decoder module 229 and output module 230. Stimuli input module 226 may be configured to receive one or more stimuli associated with operation of an intelligent system, including simulated humanoids, simulated organisms, robotics systems, ensemble brain emulation systems, whole brain emulation systems, or any other form of intelligence emulation. In some embodiments, the stimuli input module 226 may be any sensor configured to record sensory data. Sensors may include cameras, microphones or other recording devices. In some embodiments, the sensors may be virtual sensors, real sensors or combination thereof.

Encoder module 227 may be configured to translate the stimuli input data captured by the stimuli input module into activations to be fed into the cognitive state module 228.

Cognitive state module 228 may be configured to maintain and evolve the cognitive state of the intelligent system. The cognitive state module 228 may further be configured to predict one or more next states based on sequences of prior cognitive states, decoded input from the encoder module 227 and addition internal and external stimuli. In some embodiments, cognitive state module 228 may comprise one or more machine learning models configured to analyze current and past cognitive states and predict future states. In some embodiments, the cognitive state module 228 may also include an inference module configured to be run solely on the cognitive state of the system. In some embodiments, the one or more of the one or more machine learning models may be configured to model network dynamics of the cognitive state. One or more of the one or more machine learning models may be dedicated to the modeling of changes of the cognitive states over time.

The decoder module 229 may be configured to translate the current cognitive state of the cognitive state module 228 into behaviors. The behaviors may be converted by the output module 230 to understandable syntax of one or more output devices. The output module 230 may drive the operation of the output devices, including physical movement/activation of devices. In some embodiments, the decoder module may be configured to analyze a plurality of cognitive states to identify intended behaviors that are to be translated into understandable syntax for the one or more output devices.

Machine learning module 231 may further comprise training module 232. Training module 232 may further comprise evaluation module 233 and data acquisition module 234.

Training module 232 may be configured to train one or more machine learning models based on received training data. In some embodiments, the training module may be configured to train a next-state prediction model that is to be used by the cognitive state module 228.

In some embodiments, the evaluation module 233 may be configured to analyze the one or more trained machine learning models generated by the training module 232. The analysis may be configured to identify predictions with low accuracy (below a threshold). In some embodiments, the evaluation module 223 may be configured to identify one or more sets training data that resulted in the low accuracy predictions and request additional datasets specifically corresponding to data pairings (fMRI and stimuli) associated with the low accuracy predictions.

The data acquisition module 234 may be configured to acquire the additional datasets, and the training module 232 may then update the model based on the additional datasets.

In some embodiments, the intelligence emulation controller may be configured to operate in virtual and real world/physical environments. The intelligence emulation controller 234 may be configured to directly control physical embodiments.

Figure 3A:
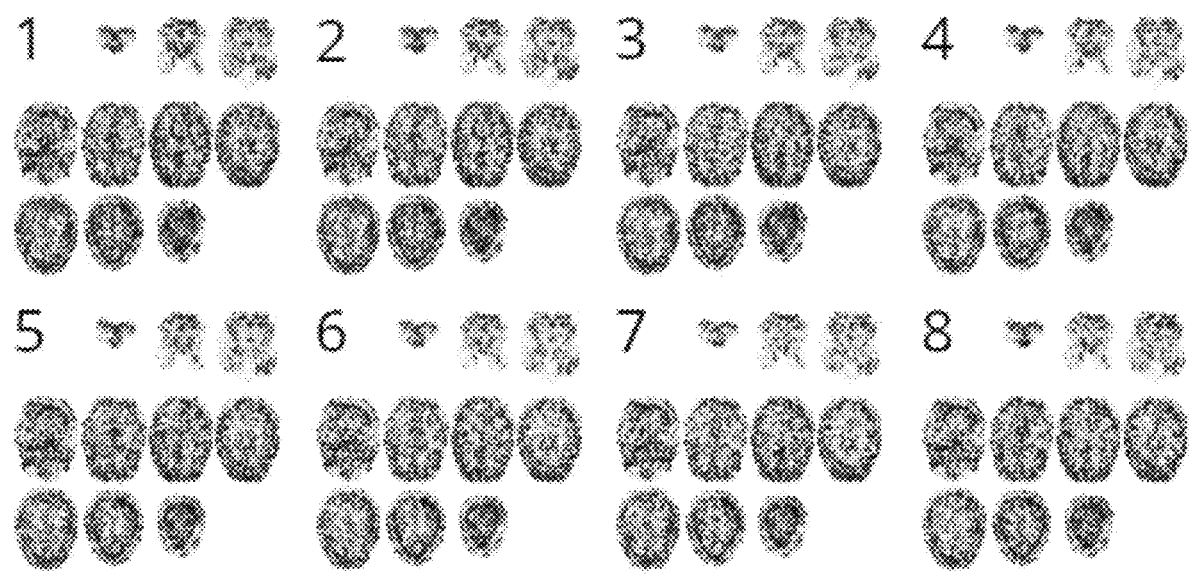
FIG. 3A is a diagram illustrating an exemplary representation of functional neurodata brain states in accordance with some embodiments.

FIG. 3A is a diagram illustrating an exemplary representation of functional neurodata frame states in accordance with some embodiments. In some embodiments, the functional neurodata frame states may be generated from and/or correspond to fMRI states of brain, both real and emulated. In some embodiments, the fMRI state of a simulated humanoid or whole brain emulation model may be represented as a two-dimensional image. For example, as is shown in FIG. 3A, the representation is shown as a grid of 3×4 fMRI cross-sections of the entire brain. In some embodiments, 3D representations and multidimensional representations may be used to represent the brain states. The 2D representation may be used over a 3D format to take advantage of the capabilities of current image and video generation model architectures, which are more adept at handling 2D data for simulating fMRI activity. This approach may be used to streamline the translation of visual inputs into neural activity patterns while still providing a detailed overview of the brain's responses across various cross-sections.

Figure 3B:
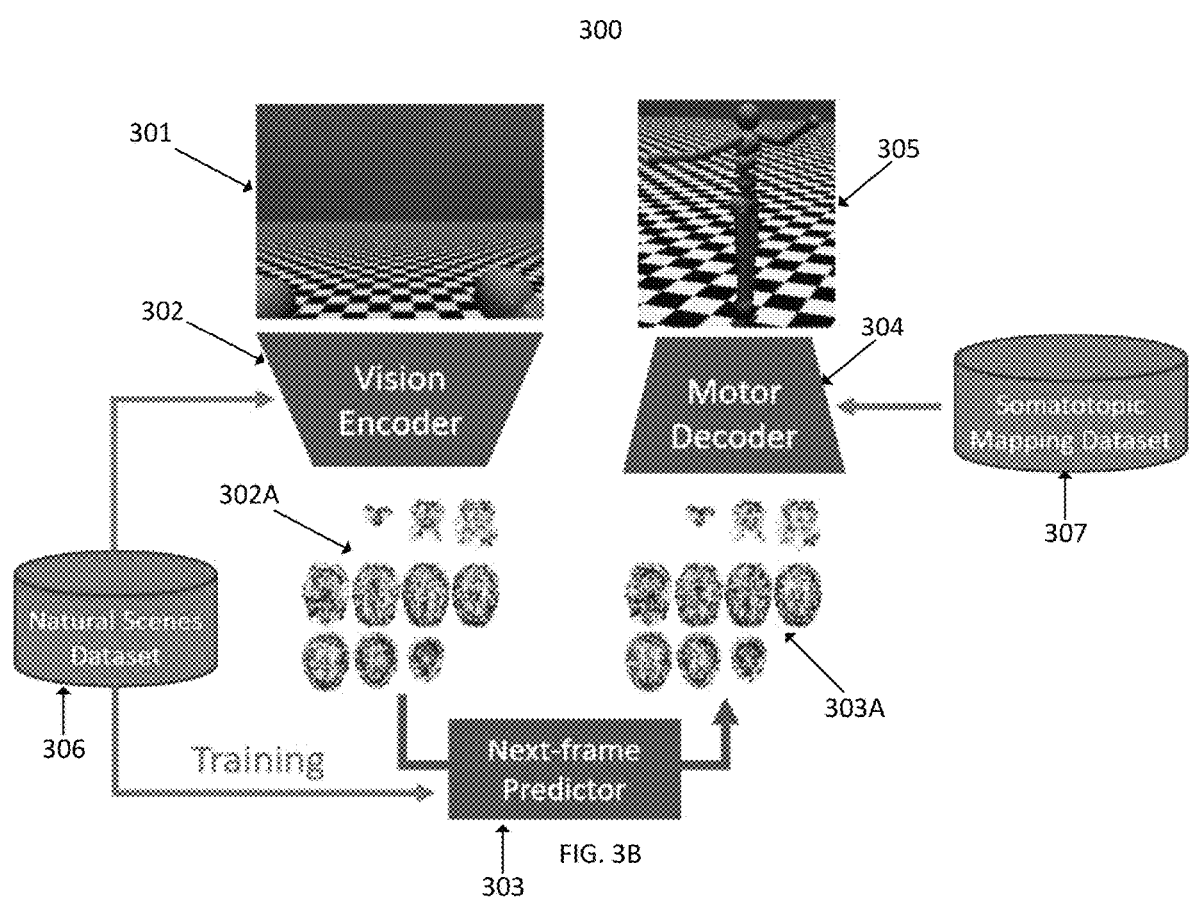
FIG. 3B is a diagram illustrating an exemplary brain emulation process flow in accordance with some embodiments.

FIG. 3B is a diagram illustrating an exemplary whole brain emulator 300 for a simulated humanoid operating within a 3D physics environment in accordance with some embodiments. The whole brain emulator 300 may comprise vision capture 301, vision encoder 302, next-state predictor 303, motor decoder 304, output behavior 305, natural scenes datasets 306 and somatotopic mapping dataset 307. The whole brain emulator may be configured for visual perception and motor response to said visual perceptions.

In some embodiments, the vision capture 301 may be performed through a virtual camera which feeds into the vision encoder 302. In some embodiments, vision capture 301 may be placed on the head of the simulated humanoid.

The vision encoder 302 may translate the captured images into simulated fMRI activity patterns 302A. The simulated fMRI activity patterns 302A may then be used by the next-state predictor 303 to update a brain state 303A of the whole brain emulator. The brain state 303A may be updated in real-time.

In some embodiments, the vision encoder 302 may be trained on paired visual stimuli and corresponding fMRI response data. The training may be configured to map a correlation between visual inputs and neural activity. Natural scenes datasets 306 may also be used in the training and validating of the vision encoder 302.

In some embodiments, the vision encoder may be configured to compress fMRI data into a vector representation.

The next-state predictor 303 may comprise one or more trained ML models. In some embodiments, the next-state predictor 303 may be a convolutional Long Short-Term Memory (ConvLSTM) model. The next-state predictor 303 may be configured to predict future brain states based on analysis of sequential fMRI data.

The motor decoder 304 may be trained on a somatotopic mapping dataset 307. The somatotopic mapping dataset 307 may comprise paired human joint movement data and corresponding fMRI activity data. The motor decoder 304 may generate a model to translate brain state 303A into corresponding physical movements in the 3D environment.

In some embodiments, the motor decoder 304 may process the pixel information from the fMRI frame, using it to calculate the probability of movement for specific body parts, including the upper and lower arms, and the left and right legs.

The whole brain emulator 300 may be configured to integrate the vision encoding, motor decoding, and next state prediction models, resulting in the simulated humanoid to maintain its brain state, process visual inputs from the camera on its head, and respond with joint movements in the physical simulation.

In some embodiments, the whole brain emulator 300 may be configured to feed image data into the vision encoder 302 from multiple sources. Image data may be directly fed from the virtual camera (vision capture 301) as well as images from an image dataset such as natural scenes dataset 306. In some embodiments, the whole brain emulator 300 may be configured to simulate dreams, daydreams, hallucinations, inner thought or other forms "imagination." The imagination simulation may be performed by feeding random images from an image dataset into the next-state predictor 303. This may be accomplished by interleaving the direct feed from the virtual camera with the random image. In some embodiments, the random image may be interleaved at predetermined intervals. The intervals may also be random.

Figure 3C:
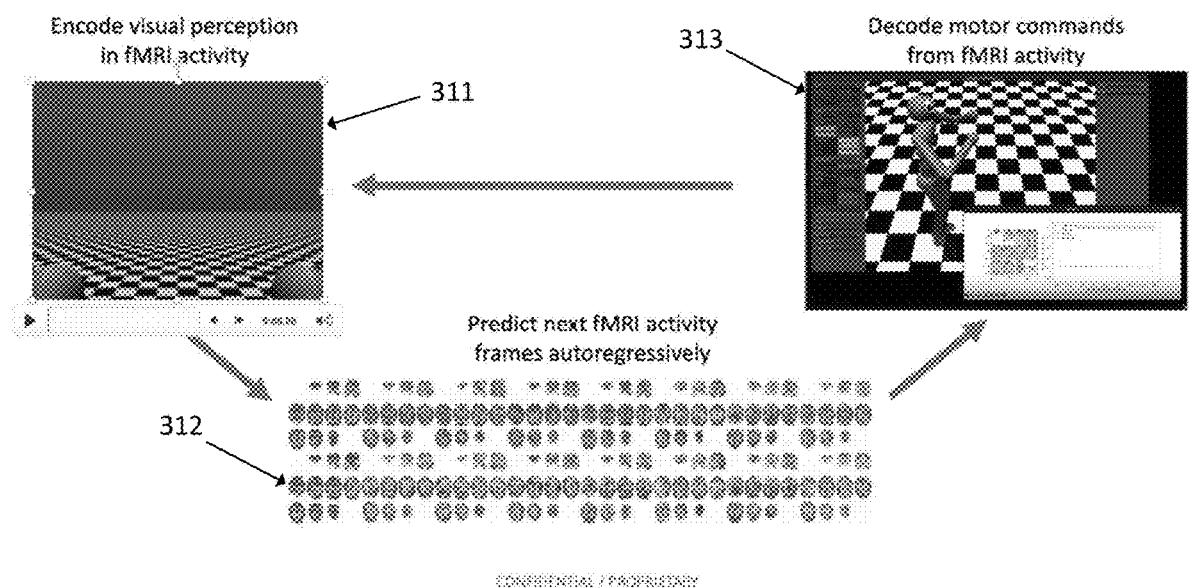
FIG. 3C is a diagram illustrating an exemplary closed loop process in accordance with some embodiments.

FIG. 3C is a diagram illustrating an exemplary closed loop process 310 performed by the whole brain emulator. The closed loop process 310 may comprise the steps of encoding a visual perception in fMRI activity 311, predicting the next fMRI activity frames 312 and decoding motor commands from the predicted activity frame 313. The next fMRI activity frames 312 may correspond to one or more next brain states of the whole brain emulator. In some embodiments, the closed loop process 310 may be performed by one or more whole brain emulators, one or more whole organism emulators, one or more artificial/synthetic intelligent system emulators or combination thereof. The decoded motor commands 313 may result in output behaviors that are captured by the virtual camera or other stimuli input devices and in turn become part of the visual perception that is then encoded at step 311. In some embodiments, the decoded motor commands may be used to drive robotic systems or control one or more physical motor systems.

Figure 3D:
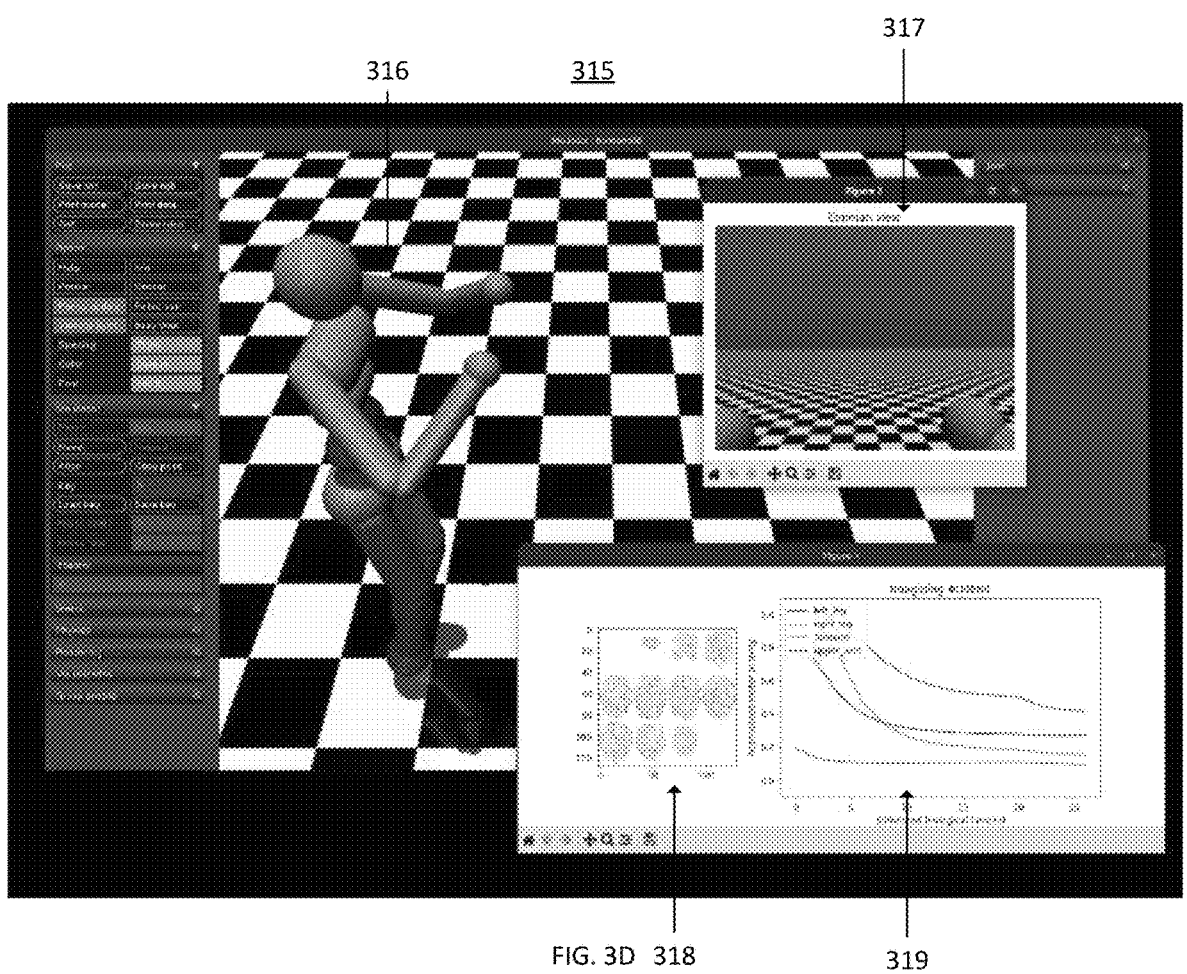
FIG. 3D is a diagram illustrating an exemplary 3D physics environment in accordance with some embodiments.

FIG. 3D is a diagram illustrating the 3D physics environment in which the whole brain emulator 300 and the corresponding simulated humanoid 316 operate. Visual display window 317 may be configured to display captured visual stimuli input data captured by a virtual camera positioned on the simulated humanoids head. A current brain state 318 of the humanoid 316 may be displayed as a visual representation of fMRI data. In some embodiments, a motor control graph 319 may be configured to display activations of limbs/body parts of the humanoid 316, wherein the activations are generated based on decoded behaviors corresponding to the current brain state 318.

Figure 3E:
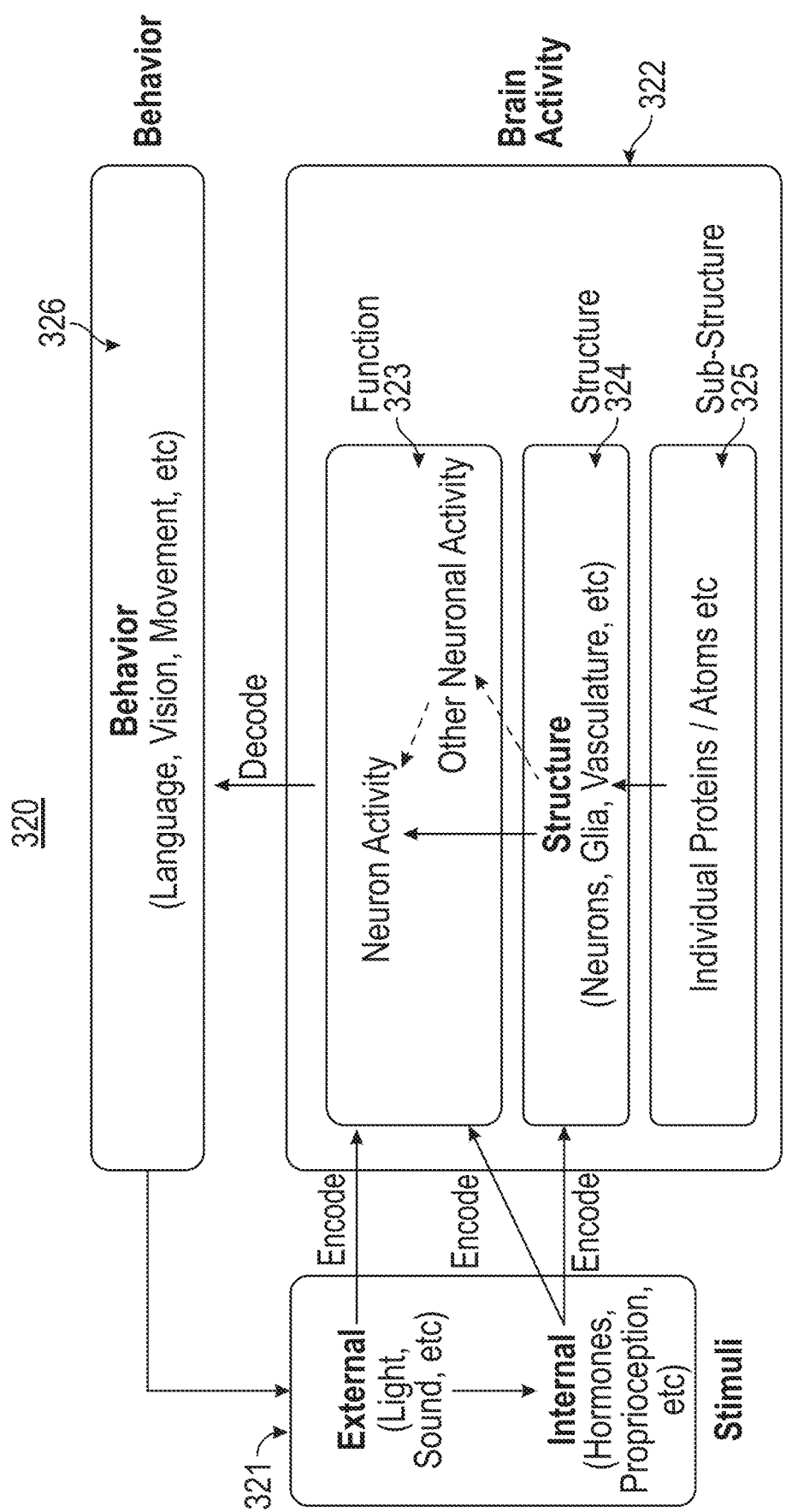
FIG. 3E is a diagram illustrating an exemplary framework in accordance with some embodiments.

FIG. 3E is a diagram illustrating an exemplary framework 320 for constructing a whole brain emulation system in accordance with some embodiments. The emulation may be constructed using a plurality of data layers. The data layers may comprise a stimuli layer 321, a brain activity layer 322 and a behavior layer 326.

Stimuli layer 321 may be configured to receive or capture internal and external stimuli. In some embodiments, the stimuli may include light, sound, hormones, proprioception or other input that can influence brain operation/perceptions. The captured stimuli may be encoded, wherein the encoding may comprise translating the captured stimuli into input for internal function 323, structure 324 and substructure 325 layers of the brain activity layer 322.

Within the brain activity layer 322, the structure layer 324 may use the encoded input to determine the accurate state of the network architecture by simulating the dynamics of the network structure and its environment over time based at least in part on its own activity and additional influencing factors.

The function layer 323 may be configured to simulate activity across the network architecture correctly, based on previous activity, the structure, external stimuli and potential other influencing factors. In some embodiments, the functional layer 323 may be configured to determine where (location) in the network activity arises and the speed of propagation of the activity across the network. The location of the activity and the speed of travel of the activity may be used in the generation/updating of brain states. The simulated neuron/network activity of the function layer 323 may be decoded into understandable syntax of one or more output device.

The behavior layer 326 may be configured to interface the decoded brain activity with output devices. In some embodiments, the behavior layer 326 may be configured to influence physical objects such as movement of a body, generation and playing of audio or video or other interactions with the world.

Figure 3F:
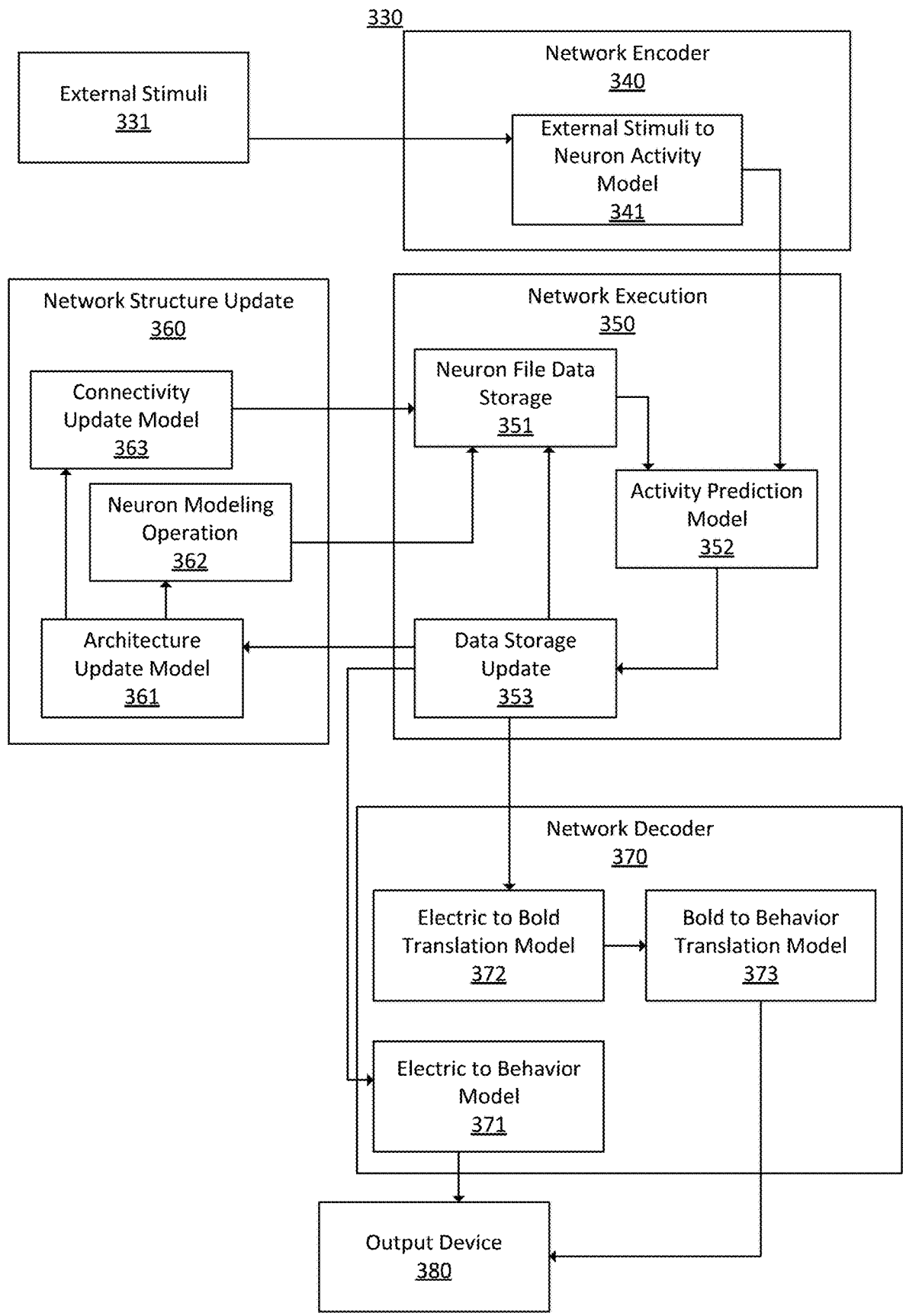
FIG. 3F is a diagram illustrating an exemplary framework in accordance with some embodiments.
Figure 3F:
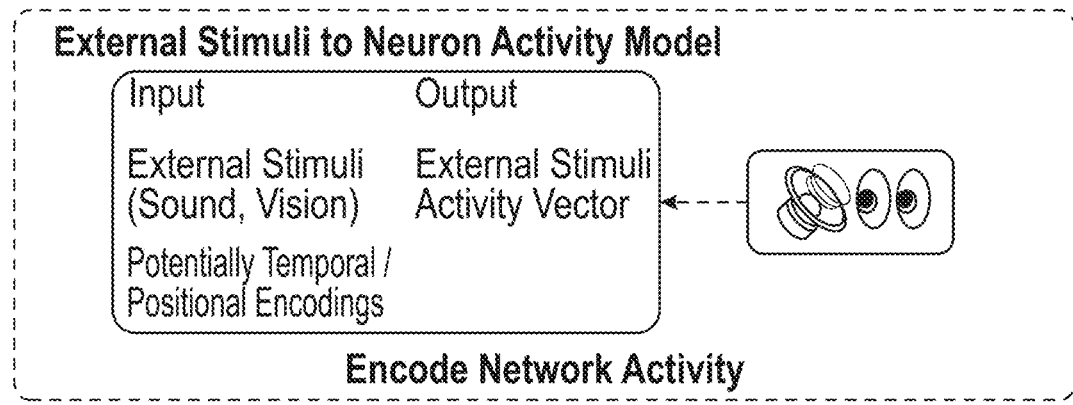

FIG. 3F is a diagram illustrating an exemplary emulation framework 330 in accordance with some embodiments. The emulation framework 330 comprises external stimuli 331, network encoder 340, network execution 350, network structure update 360, network decoder 370 and output device 380.

Network encoder 340 may comprise external stimuli to neuron activity model 341.

Network execution 350 may further comprise neuron file data storage 351, activity prediction model 352 and data storage update 353.

Network structure update 360 may further comprise architecture update model 361, neuron modeling operation 362, connectivity update model 363.

Network decoder 370 may further comprise electric to behavior model 371, electric to bold translation model 372, bold to behavior translation model 373.

Figure 3G:
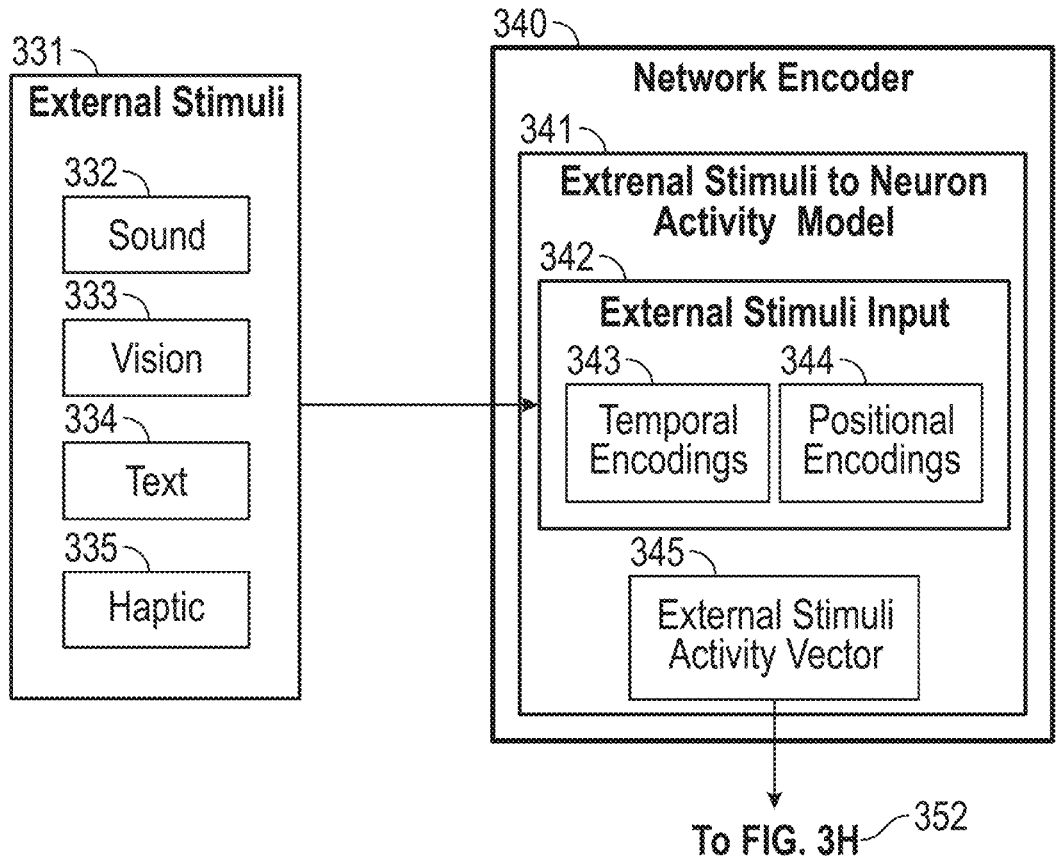
FIG. 3G is a diagram illustrating an exemplary framework in accordance with some embodiments.

FIG. 3G is a diagram illustrating a network encoder 340 comprising external stimuli to neuron activity model 341 in accordance with some embodiments. External stimuli to neuron activity model 341 may further comprise external stimuli input 342 and external stimuli activity vector 345. The external stimuli input 342 may further comprise temporal encodings 343 and positional encodings 344. As shown in FIG. 3G, external stimuli 331 may comprise sound 332, vision 333, text 334 and haptic 335 stimuli that are received at external stimuli input 342.

Figure 3H:
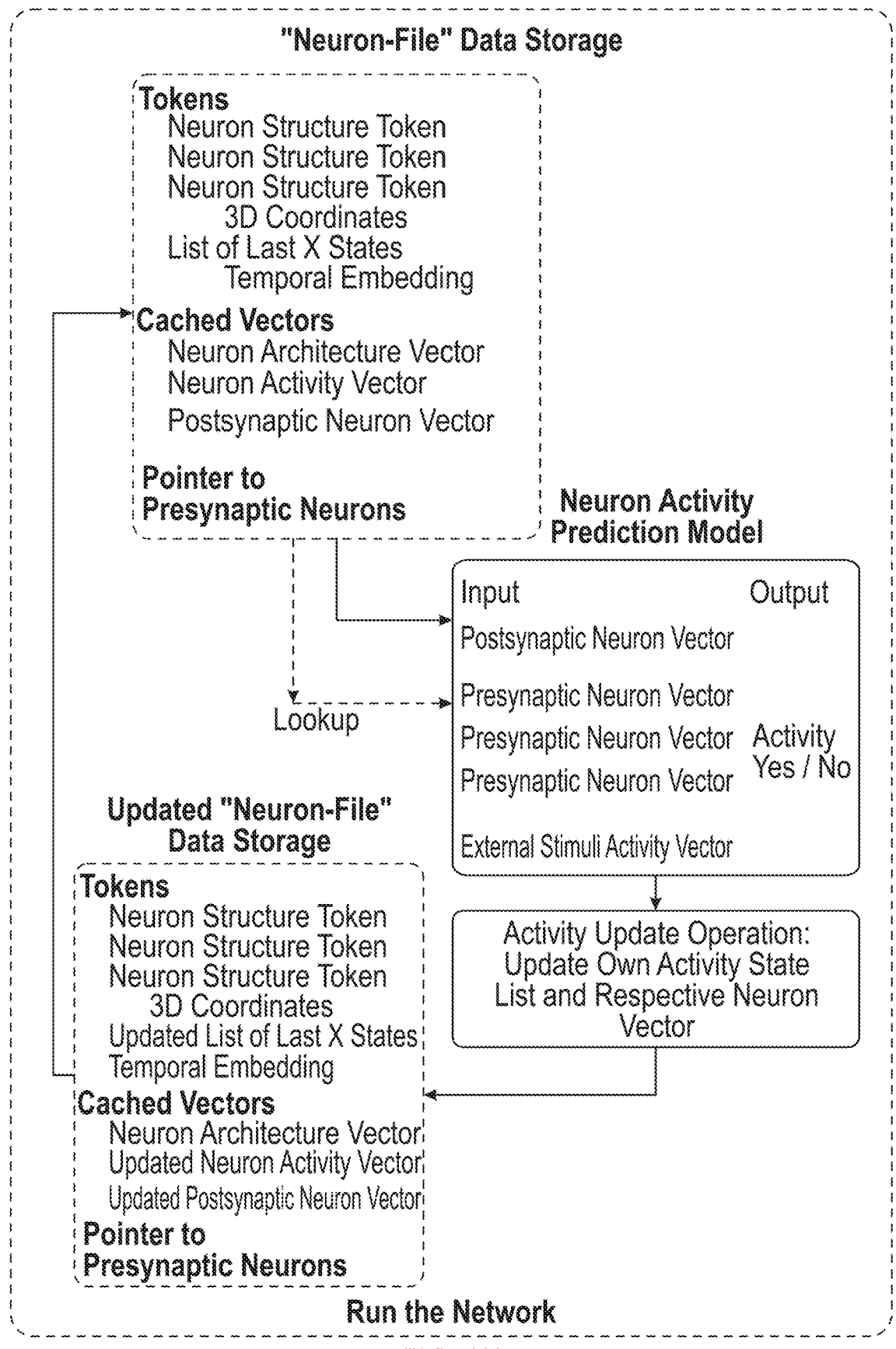
FIG. 3H is a diagram illustrating an exemplary framework in accordance with some embodiments.
Figure 3H:
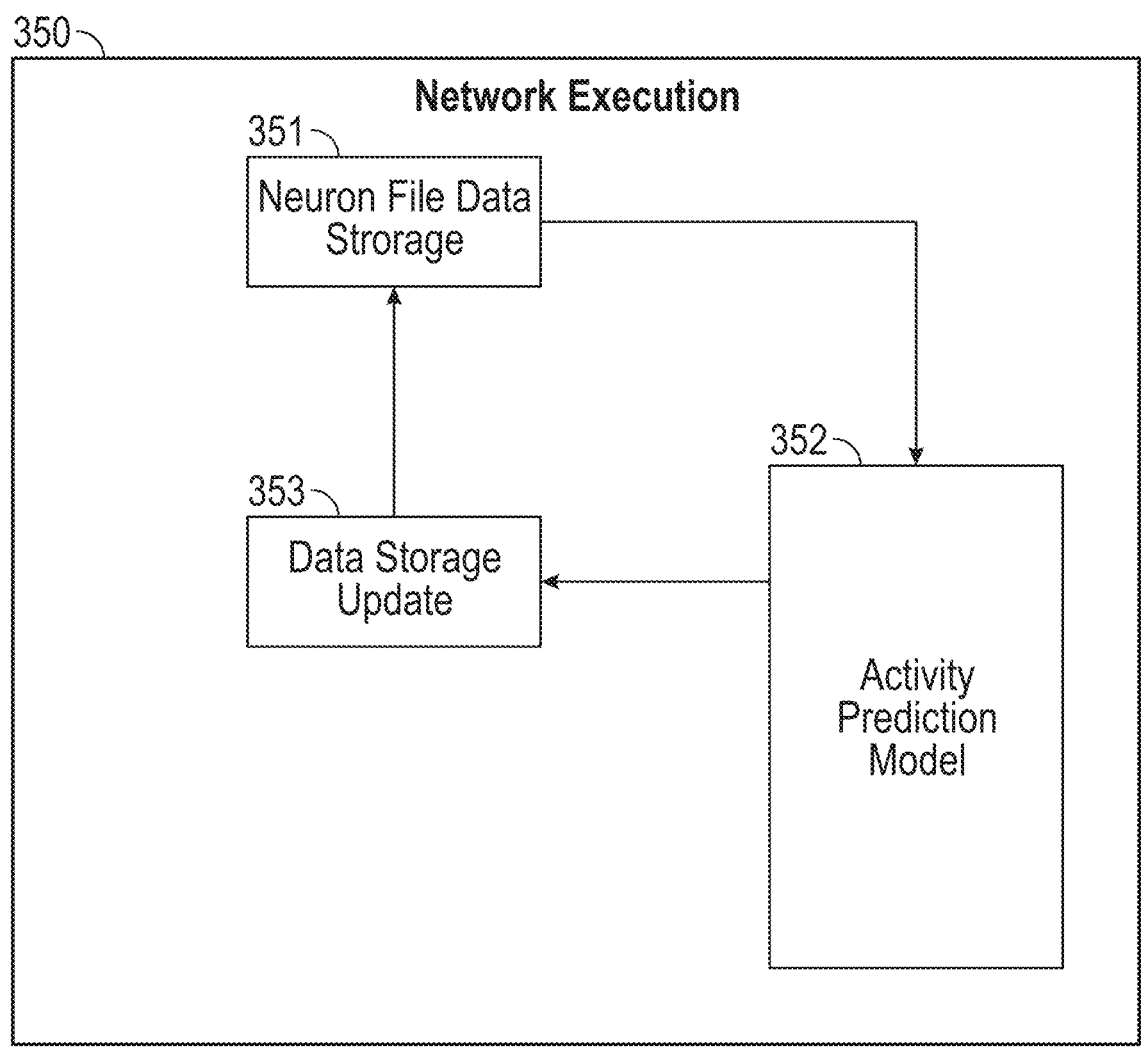

FIG. 3H is a diagram illustrating a network execution 350 in accordance with some embodiments. The diagram depicts operation of the system with a neuron file data storage 351, activity prediction model 352, and a data storage update 353.

Figure 3I:
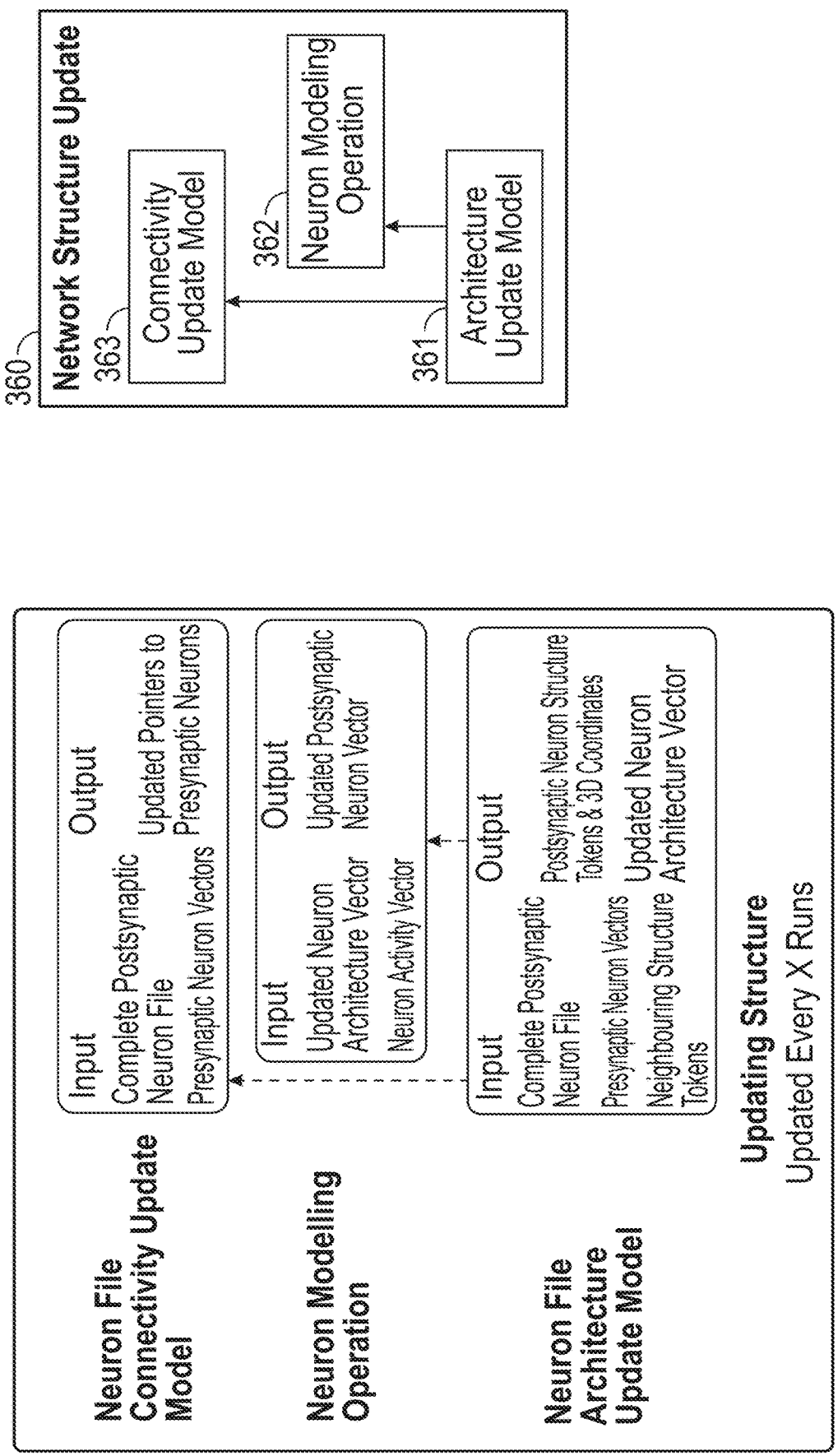
FIG. 3I is a diagram illustrating an exemplary framework in accordance with some embodiments.

FIG. 3I is a diagram illustrating a network structure update 360 in accordance with some embodiments. The diagram depicts operation of the system with a network update structure 360, architecture update model 361, neuron modeling operation 362, and a connectivity update model 363.

Figure 3J:
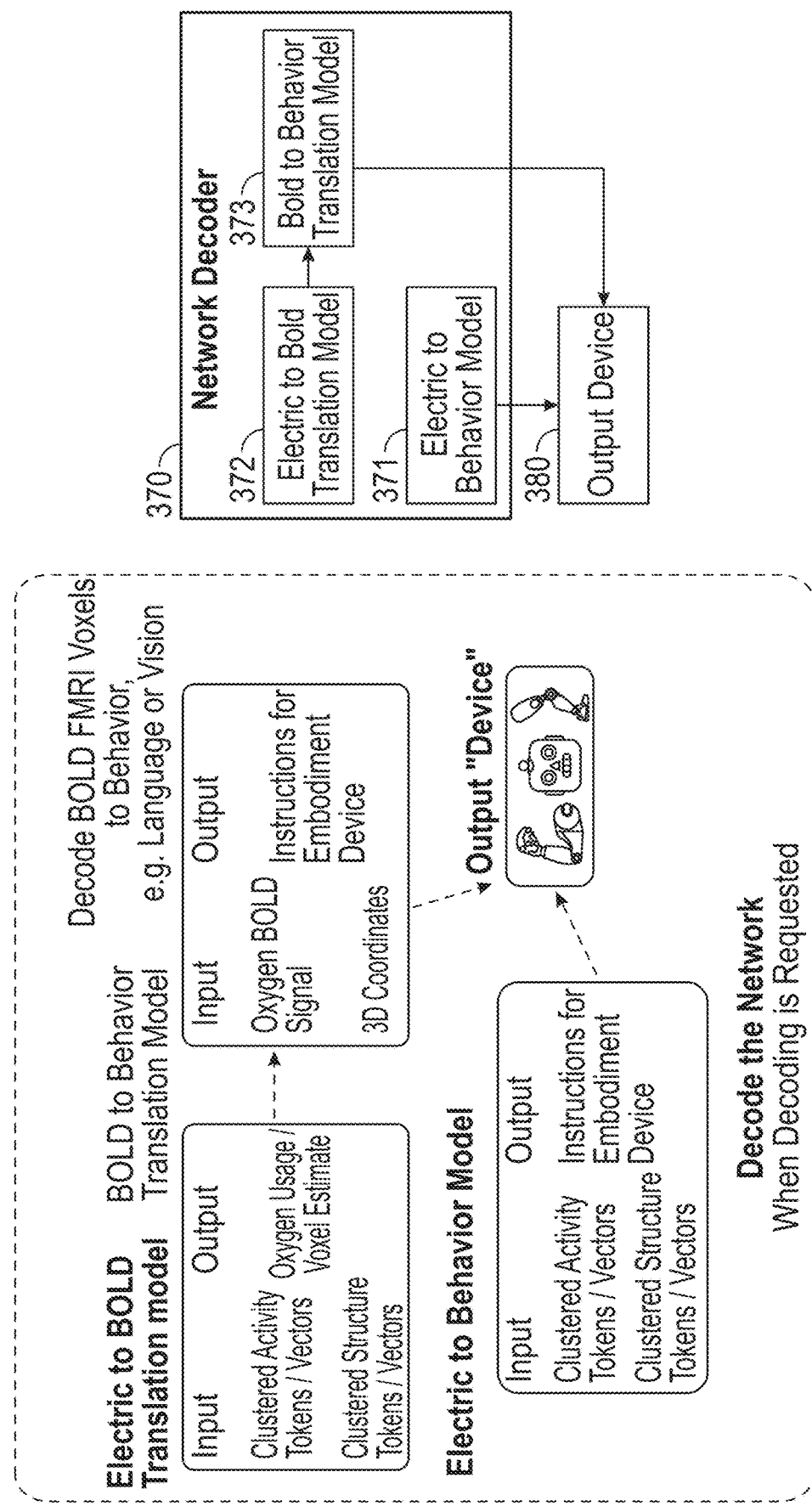
FIG. 3J is a diagram illustrating an exemplary framework in accordance with some embodiments.

FIG. 3J is a diagram illustrating a network decoder 370 in accordance with some embodiments. The diagram depicts operation of the system with a network decoder 370, electric to behavior model 371, electric to bold translation model 372, and a bold to behavior translation model 373.

Figure 4:
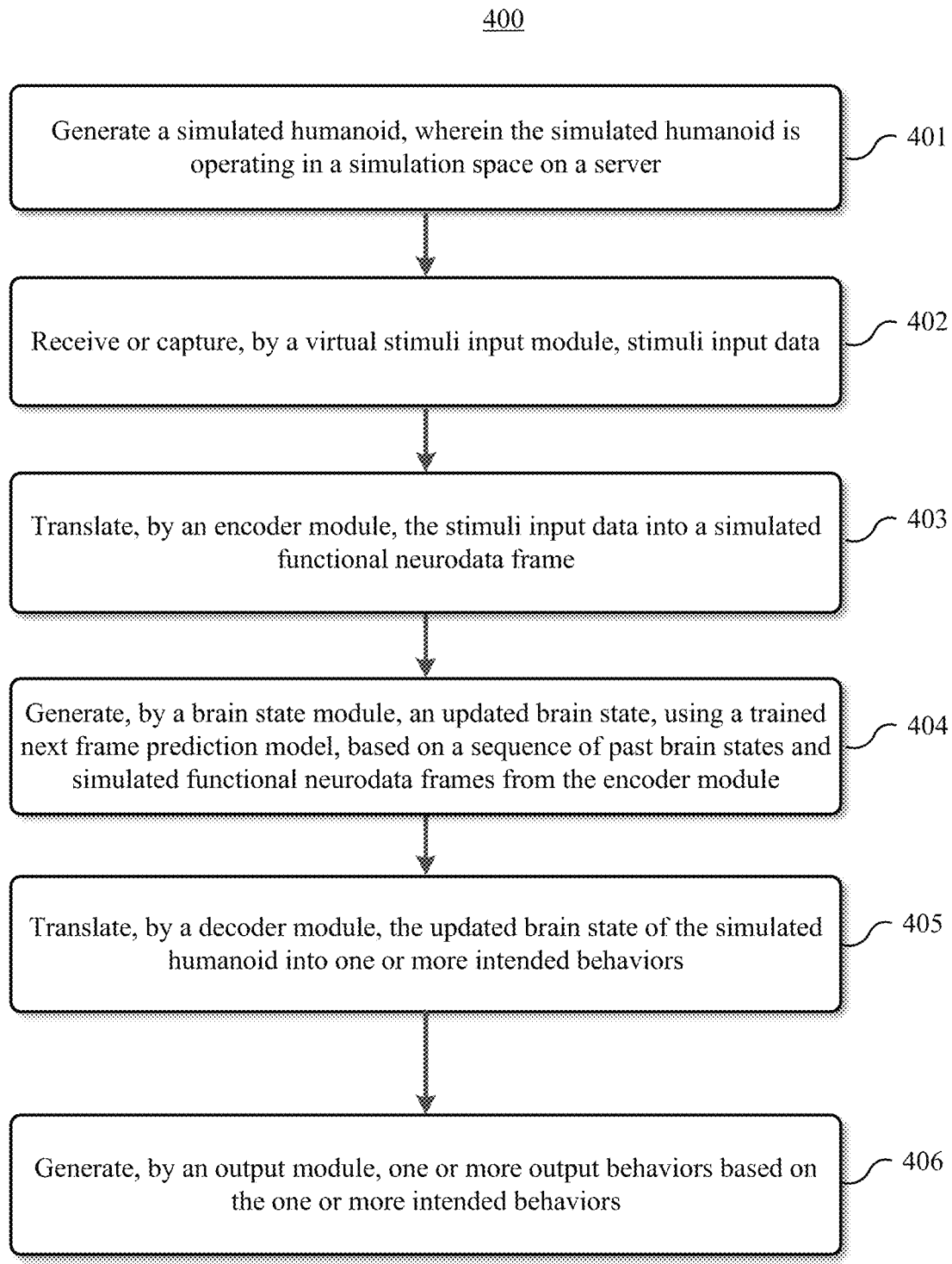
FIG. 4 is a flow chart illustrating an exemplary method that may be performed in accordance with some embodiments.

FIG. 4 is a flow chart illustrating an exemplary method 400 that may be performed in accordance with some embodiments.

At step 401, the system is configured to generate a simulated humanoid, wherein the simulated humanoid is operating in a simulation space on a server.

At step 402, the system is configured to receive or capture, by a stimuli input module, stimuli input data.

At step 403, the system is configured to translate, by an encoder module, the stimuli input data into a simulated functional neurodata frame.

At step 404, the system is configured to generate, by a brain state module, an updated brain state, using a trained next state prediction model, based on a sequence of past brain states and simulated functional neurodata frames from the encoder module.

At step 405, the system is configured to translate, by a decoder module, the updated brain state of the simulated humanoid into one or more intended behaviors.

At step 406, the system is configured to generate, by an output module, one or more output behaviors, commands and/or instructions based on the one or more intended behaviors.

Figure 5:
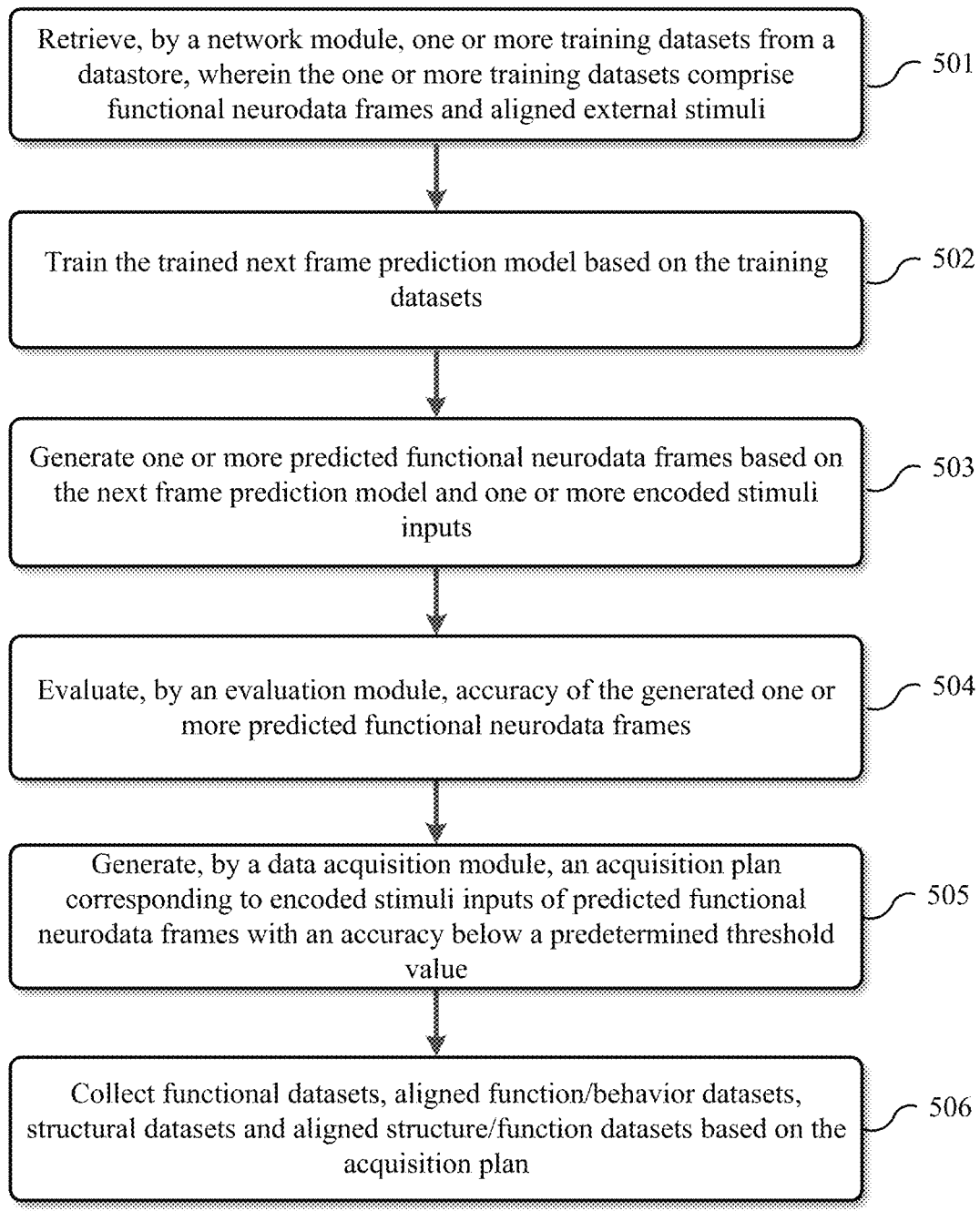
FIG. 5 is a flow chart illustrating an exemplary method that may be performed in accordance with some embodiments.

FIG. 5 is a flow chart illustrating an exemplary method 400 that may be performed in accordance with some embodiments.

At step 501, the system is configured to retrieve, by a network module, one or more training datasets from a datastore, wherein the one or more training datasets comprise functional neurodata frames and aligned external stimuli.

At step 502, the system is configured to train the trained next state prediction model based on the training datasets.

At step 503, the system is configured to generate one or more predicted functional neurodata frames based on the next state prediction model and one or more encoded stimuli inputs.

At step 504, the system is configured to evaluate, by an evaluation module, accuracy of the generated one or more predicted functional neurodata frames.

At step 505, the system is configured to generate, by a data acquisition module, an acquisition plan corresponding to encoded stimuli inputs of predicted functional neurodata frames with an accuracy below a predetermined threshold value.

At step 506, the system is configured to collect functional datasets, aligned function/behavior datasets, structural datasets and aligned structure/function datasets based on the acquisition plan.

Figure 6:
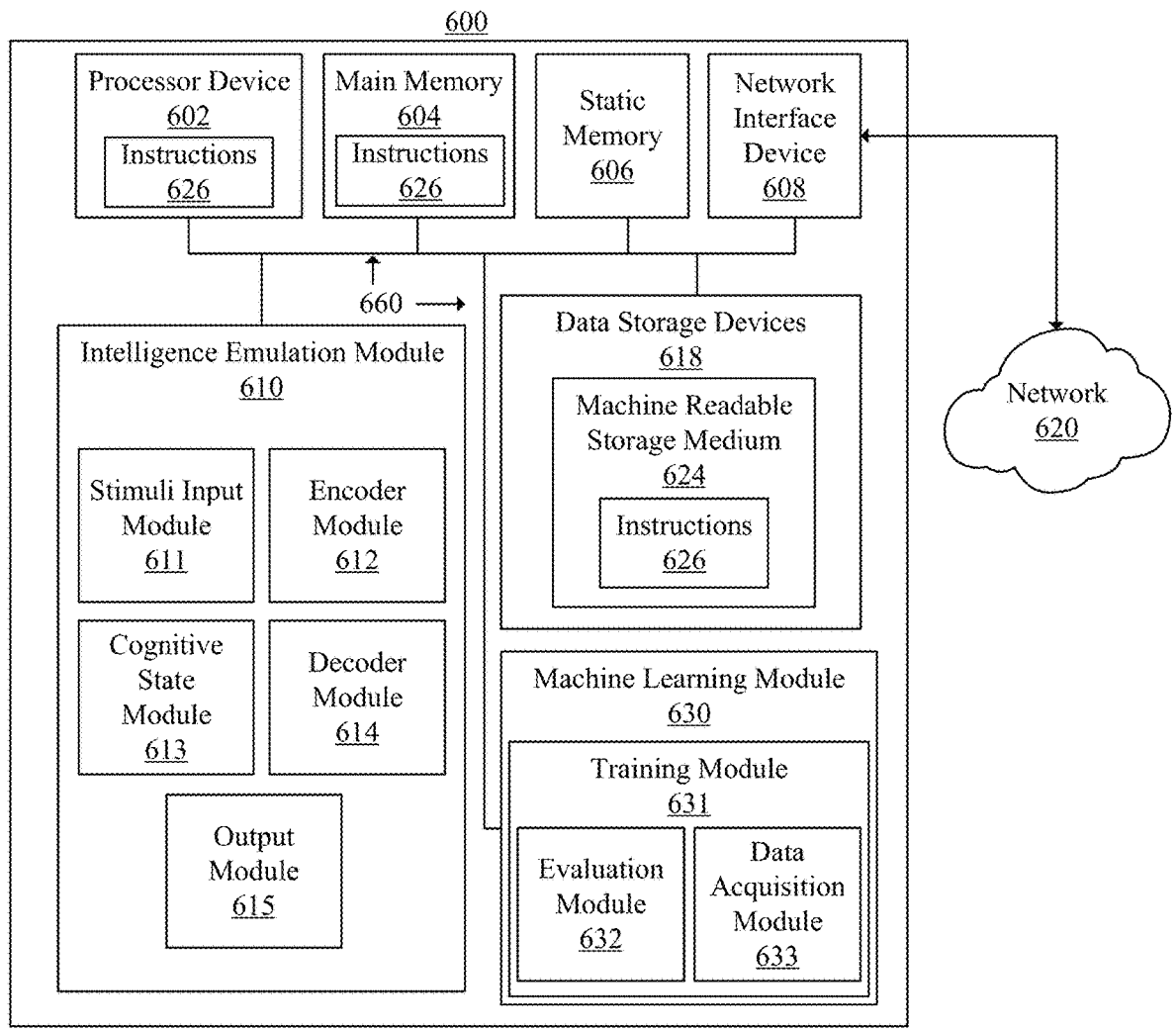
FIG. 6 is a diagram illustrating an exemplary computer/control system that may perform processing in some embodiments and in accordance with aspects of the present disclosure.

FIG. 6 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, an ad-hoc network, a mesh network, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a neuromorphic computing device, a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 660.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein.

The computer system 600 may further include a network interface device 608 to communicate over the network 620. The computer system 600 also may include intelligence emulation module 610 and machine learning module 630. Intelligence emulation module 610 may comprise stimuli input module 611, encoder module 612, cognitive state module 613, decoder module 614 and output module 615. Intelligence emulation module 610, stimuli input module 611, encoder module 612, cognitive state module 613, decoder module 614 and output module 615 may be the same or similar to that of intelligence emulation controller 225, stimuli input module 226, encoder module 227, cognitive state module 228, decoder module 229 and output module 230 as disclosed in FIG. 2B.

Machine learning module 630 may comprise training module 631. Training module 631 may further comprise evaluation module 632 and data acquisition module 633. Machine learning module 630, training module 631, evaluation module 632 and data acquisition module 633 may be the same or similar to that of machine learning module 231, training module 232, evaluation module 233 and data acquisition module 234 as disclosed in FIG. 2B.

The data storage device 618 may include a machine-readable storage medium 624 (also known as a computer-readable medium) on which is stored one or more sets of instructions or software 626 embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media. Information, including data used in the processes and methods of the system and the one or more sets of instructions or software, may also be stored in blockchain, as NFTs or other decentralized technologies.

In one implementation, the instructions 626 include instructions to implement functionality corresponding to the components of a device to perform the disclosure herein. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

It will be appreciated that the present disclosure may include any one and up to all of the following examples.

Example 1. A machine learning-based whole brain emulation system, wherein the system comprises: a datastore, wherein the datastore comprises one or more training datasets, wherein the one or more training datasets comprise resting brain state datasets and stimulated brain state datasets; a server, wherein the server comprises: a network module, wherein the network module is configured to receive the one or more training datasets from the datastore; a machine learning module, wherein the machine learning module comprises: a training module, wherein the training module is configured to: retrieve, from the datastore, the one or more training datasets, wherein the one or more training datasets comprise functional neurodata frames and aligned external stimuli; and train a next state prediction model based on the training datasets; a simulated humanoid, operating in a simulation space on the server, wherein the simulated humanoid comprises a whole brain emulation module, the whole brain emulation module comprises: a virtual stimuli input module, wherein the virtual stimuli input module is configured to receive or capture stimuli input data; an encoder module, wherein the encoder module is configured to translate the stimuli input data into a simulated functional neurodata frame; a brain state module, wherein the brain state module comprises: a current brain state corresponding to a current functional neurodata frame of the simulated humanoid; and a trained next state prediction model, wherein the trained next state prediction model is configured to generate an updated brain state based on a sequence of past brain states and simulated functional neurodata frames from the encoder module; a decoder module, wherein the decoder module is configured to translate the updated brain state of the simulated humanoid into one or more intended behaviors; and an output module, wherein the output module is configured to generate one or more output behaviors, commands and/or instructions based on the one or more intended behaviors.

Example 2. The system of Example 1, wherein the stimuli input data comprises any one or more of the following: visual input to a person, audible input to a person, input to a person, taste input information, or other sensory input to the person.

Example 3. The system of any one of Examples 1-2, wherein the virtual stimuli input module is a virtual camera.

Example 4. The system of any one of Examples 1-3, wherein the stimuli data comprises internal and external stimuli data.

Example 5. The system of any one of Examples 1-4, wherein the stimuli data correspond to real world stimuli.

Example 6. The system of any one of Examples 1-5, wherein the stimuli data correspond to synthetically generated stimuli.

Example 7. The system of any one of Examples 1-6, wherein functional neurodata frames are representations of brain structure and function, wherein the representations correspond to a recording modality.

Example 8. The system of any one of Examples 1-7, wherein the recording modality comprises any one or more of the following: Electro-encephalography (EEG); functional Near-Infrared Spectroscopy (fNIRS); Magneto-encephalography (MEG); functional Magnetic Resonance Imaging (fMRI); functional Ultrasound (fUS); Electron Microscopy; Expansion Microscopy; Histological Data; MEA Spike Trains; or $Ca^{2+}$ Imaging (or Fluorescence imaging);

Example 9. The system of any one of Examples 1-8, wherein the training module is further configured to: Generate one or more predicted functional neurodata frames based on the next state prediction model and one or more encoded stimuli inputs; evaluate, by an evaluation module, accuracy of the generated one or more predicted functional neurodata frames; and generate, by a data acquisition module, an acquisition plan corresponding to encoded stimuli inputs of predicted functional neurodata frames with an accuracy below a predetermined threshold value.

Example 10. The system of any one of Examples 1-9, wherein the data acquisition module is configured to collect functional datasets, aligned function/behavior datasets, structural datasets and aligned structure/function datasets based on the acquisition plan.

Example 11. The system of any one of Examples 1-10, wherein the output behaviors comprise one or more of the following: generating textual output; generating image output; generating video output; generating actions or commands to maneuver a simulated person; or generating speech.

Example 12. The system of any one of Examples 1-11, wherein a portion of the output behaviors is input back into the brain state module, to generate new output.

Example 13. A method comprising: generating a simulated humanoid, wherein the simulated humanoid is operating in a simulation space on a server and wherein the simulated humanoid comprises a whole brain emulation module, the whole brain emulation module comprising: a virtual stimuli input module, wherein the virtual stimuli input module is configured to receive or capture stimuli input data; an encoder module, wherein the encoder module is configured to translate the stimuli input data into a simulated functional neurodata frame; a brain state module, wherein the brain state module comprises: a current brain state corresponding to a current functional neurodata frame of the simulated humanoid; and a trained next state prediction model, wherein the trained next state prediction model is configured to generate an updated brain state based on a sequence of past brain states and simulated functional neurodata frames from the encoder module; a decoder module, wherein the decoder module is configured to translate the updated brain state of the simulated humanoid into one or more intended behaviors; and an output module, wherein the output module is configured to generate one or more output behaviors, commands and/or instructions based on the one or more intended behaviors.

Example 14. The method of Example 13, wherein the trained next state prediction model is a machine learning model trained by a training module operating on the server, and wherein the training module is configured to: retrieve, by a network module, one or more training datasets from a datastore, wherein the one or more training datasets comprise functional neurodata frames and aligned external stimuli; and train the trained next state prediction model based on the training datasets.

Example 15. The method of any one of Examples 13-14, wherein the stimuli input data comprises any one or more of the following: visual input to a person, audible input to a person, input to a person, taste input information, or other sensory input to the person.

Example 16. The method of any one of Examples 13-15, wherein the virtual stimuli input module is a virtual camera.

Example 17. The method of any one of Examples 13-16, wherein the stimuli data comprises internal and external stimuli data.

Example 18. The method of any one of Examples 13-17, wherein the stimuli data correspond to real world stimuli.

Example 19. The method of any one of Examples 13-18, wherein the stimuli data corresponds to synthetically generated stimuli.

Example 20. The method of any one of Examples 13-19, wherein functional neurodata frames are representations of brain structure and function, wherein the representations correspond to a recording modality.

Example 21. The method of any one of Examples 13-20, wherein the recording modality comprises any one or more of the following: Electro-encephalography (EEG); functional Near-Infrared Spectroscopy (fNIRS); Magneto-encephalography (MEG); functional Magnetic Resonance Imaging (fMRI); functional Ultrasound (fUS); Electron Microscopy; Expansion Microscopy; Histological Data; MEA Spike Trains; or $Ca^{2+}$ Imaging (or Fluorescence imaging);

Example 22. The method of any one of Examples 13-21, wherein the training module is further configured to: Generate one or more predicted functional neurodata frames based on the next state prediction model and one or more encoded stimuli inputs; evaluate, by an evaluation module, accuracy of the generated one or more predicted functional neurodata frames; and generate, by a data acquisition module, an acquisition plan corresponding to encoded stimuli inputs of predicted functional neurodata frames with an accuracy below a predetermined threshold value.

Example 23. The method of any one of Examples 13-22, wherein the data acquisition module is configured to collect functional datasets, aligned function/behavior datasets, structural datasets and aligned structure/function datasets based on the acquisition plan.

Example 24. The method of any one of Examples 13-23, wherein the output behaviors comprise one or more of the following: generating textual output; generating image output; generating video output; generating actions or commands to maneuver a simulated person; or generating speech.

Example 25. The method of any one of Examples 13-24, wherein a portion of the output behaviors is input back into the brain state module, to generate new output.

Example 26. One or more non-transitory computer-readable media having computer-readable instructions stored thereupon which, when executed by one or more processors, cause a system to: generating a simulated humanoid, wherein the simulated humanoid is operating in a simulation space on a server and wherein the simulated humanoid comprises a whole brain emulation module, the whole brain emulation module comprising: a virtual stimuli input module, wherein the virtual stimuli input module is configured to receive or capture stimuli input data; an encoder module, wherein the encoder module is configured to translate the stimuli input data into a simulated functional neurodata frame; a brain state module, wherein the brain state module comprises: a current brain state corresponding to a current functional neurodata frame of the simulated humanoid; and a trained next state prediction model, wherein the trained next state prediction model is configured to generate an updated brain state based on a sequence of past brain states and simulated functional neurodata frames from the encoder module; a decoder module, wherein the decoder module is configured to translate the updated brain state of the simulated humanoid into one or more intended behaviors; and an output module, wherein the output module is configured to generate one or more output behaviors, commands and/or instructions based on the one or more intended behaviors.

Example 27. The computer-readable media of Example 26, wherein the trained next state prediction model is a machine learning model trained by a training module operating on the server, and wherein the training module is configured to: retrieve, by a network module, one or more training datasets from a datastore, wherein the one or more training datasets comprise functional neurodata frames and aligned external stimuli; and train the trained next state prediction model based on the training datasets.

Example 28. The computer-readable media of any one of Examples 26-27, wherein the stimuli input data comprises any one or more of the following: visual input to a person, audible input to a person, input to a person, taste input information, or other sensory input to the person.

Example 29. The computer-readable media of any one of Examples 26-28, wherein the virtual stimuli input module is a virtual camera.

Example 30. The computer-readable media of any one of Examples 26-29, wherein the stimuli data comprises internal and external stimuli data.

Example 31. The computer-readable media of any one of Examples 26-30, wherein the stimuli data correspond to real world stimuli.

Example 32. The computer-readable media of any one of Examples 26-31, wherein the stimuli data correspond to synthetically generated stimuli.

Example 33. The computer-readable media of any one of Examples 26-32, wherein functional neurodata frames are representations of brain structure and function, wherein the representations correspond to a recording modality.

Example 34. The computer-readable media of any one of Examples 26-33, wherein the recording modality comprises any one or more of the following: Electro-encephalography (EEG); functional Near-Infrared Spectroscopy (fNIRS); Magneto-encephalography (MEG); functional Magnetic Resonance Imaging (fMRI); functional Ultrasound (fUS); Electron Microscopy; Expansion Microscopy; Histological Data; MEA Spike Trains; or $Ca^{2+}$ Imaging (or Fluorescence imaging).

Example 35. The computer-readable media of any one of Examples 26-34, wherein the training module is further configured to: generate one or more predicted functional neurodata frames based on the next state prediction model and one or more encoded stimuli inputs; evaluate, by an evaluation module, accuracy of the generated one or more predicted functional neurodata frames; and generate, by a data acquisition module, an acquisition plan corresponding to encoded stimuli inputs of predicted functional neurodata frames with an accuracy below a predetermined threshold value.

Example 36. The computer-readable media of any one of Examples 26-35, wherein the data acquisition module is configured to collect functional datasets, aligned function/behavior datasets, structural datasets and aligned structure/function datasets based on the acquisition plan.

Example 37. The computer-readable media of any one of Examples 26-36, wherein the output behaviors comprise one or more of the following: generating textual output; generating image output; generating video output; generating actions or commands to maneuver a simulated person; or generating speech.

Example 38. The computer-readable media of any one of Examples 26-37, wherein a portion of the output behaviors is input back into the brain state module, to generate new output.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A machine learning-based whole brain emulation system, wherein the system comprises:
   a datastore, wherein the datastore comprises one or more training datasets, wherein the one or more training datasets comprise resting brain state datasets and stimulated brain state datasets;
   a server, wherein the server comprises:
      a network module, wherein the network module is configured to receive the one or more training datasets from the datastore;
      a machine learning module, wherein the machine learning module comprises:
         a training module, wherein the training module is configured to:

retrieve, from the datastore, the one or more training datasets, wherein the one or more training datasets comprise functional neurodata frames and aligned external stimuli; and
train a next state prediction model based on the training datasets;
a simulated humanoid, operating in a simulation space on the server, wherein the simulated humanoid comprises a whole brain emulation module, the whole brain emulation module comprises:
a virtual stimuli input module, wherein the virtual stimuli input module is configured to receive or capture stimuli input data;
an encoder module, wherein the encoder module is configured to translate the stimuli input data into a simulated functional neurodata frame;
a brain state module, wherein the brain state module comprises:
a current brain state corresponding to a current functional neurodata frame of the simulated humanoid; and
a trained next state prediction model, wherein the trained next state prediction model is configured to generate an updated brain state based on a sequence of past brain states and simulated functional neurodata frames from the encoder module;
a decoder module, wherein the decoder module is configured to translate the updated brain state of the simulated humanoid into one or more intended behaviors; and
an output module, wherein the output module is configured to generate one or more output behaviors, commands and/or instructions based on the one or more intended behaviors;
wherein the training module is further configured to:
generate one or more predicted functional neurodata frames based on the next state prediction model and one or more encoded stimuli inputs;
evaluate, by an evaluation module, accuracy of the generated one or more predicted functional neurodata frames; and
generate, by a data acquisition module, an acquisition plan corresponding to encoded stimuli inputs of predicted functional neurodata frames with an accuracy below a predetermined threshold value.

2. The system of claim 1, wherein the stimuli input data comprises any one or more of the following: visual input to a person, audible input to a person, input to a person, taste input information, or other sensory input to the person.

3. The system of claim 1, wherein the virtual stimuli input module is a virtual camera or a physical real camera.

4. The system of claim 1, wherein the stimuli data comprises internal and external stimuli data.

5. The system of claim 1, wherein the stimuli data correspond to real world stimuli.

6. The system of claim 1, wherein the stimuli data correspond to synthetically generated stimuli.

7. The system of claim 1, wherein functional neurodata frames are representations of brain structure and function, wherein the representations correspond to a recording modality.

8. The system of claim 7, wherein the recording modality comprises any one or more of the following:
Electro-encephalography (EEG);
functional Near-Infrared Spectroscopy (fNIRS);
Magneto-encephalography (MEG);
functional Magnetic Resonance Imaging (fMRI);
functional Ultrasound (fUS);
Electron Microscopy;
Expansion Microscopy;
Histological Data;
MEA Spike Trains; or
$Ca^{2+}$ Imaging (or Fluorescence imaging).

9. The system of claim 1, wherein the data acquisition module is configured to collect functional datasets, aligned function/behavior datasets, structural datasets and aligned structure/function datasets based on the acquisition plan.

10. The system of claim 1, wherein the output behaviors comprise one or more of the following:
generating textual output;
generating image output;
generating video output;
generating actions or commands to maneuver a simulated person; or
generating speech.

11. The system of claim 10, wherein a portion of the output behaviors is input back into the brain state module, to generate new output.

12. A method comprising:
generating a simulated humanoid, wherein the simulated humanoid is operating in a simulation space on a server and wherein the simulated humanoid comprises a whole brain emulation module, the whole brain emulation module comprising:
a virtual stimuli input module, wherein the virtual stimuli input module is configured to receive or capture stimuli input data;
an encoder module, wherein the encoder module is configured to translate the stimuli input data into a simulated functional neurodata frame;
a brain state module, wherein the brain state module comprises:
a current brain state corresponding to a current functional neurodata frame of the simulated humanoid; and
a trained next state prediction model, wherein the trained next state prediction model is configured to generate an updated brain state based on a sequence of past brain states and simulated functional neurodata frames from the encoder module;
a decoder module, wherein the decoder module is configured to translate the updated brain state of the simulated humanoid into one or more intended behaviors; and
an output module, wherein the output module is configured to generate one or more output behaviors, commands and/or instructions based on the one or more intended behaviors;
wherein the trained next state prediction model is a machine learning model trained by a training module operating on the server, and wherein the training module is configured to:
retrieve, by a network module, one or more training datasets from a datastore,
wherein the one or more training datasets comprise functional neurodata frames and aligned external stimuli; and
train the trained next state prediction model based on the training datasets; and
wherein the training module is further configured to:
generate one or more predicted functional neurodata frames based on the next state prediction model and one or more encoded stimuli inputs;

evaluate, by an evaluation module, accuracy of the generated one or more predicted functional neurodata frames; and generate, by a data acquisition module, an acquisition plan corresponding to encoded stimuli inputs of predicted functional neurodata frames with an accuracy below a predetermined threshold value.

13. The method of claim 12, wherein the stimuli input data comprises any one or more of the following: visual input to a person, audible input to a person, input to a person, taste input information, or other sensory input to the person.

14. The method of claim 12, wherein the virtual stimuli input module is a virtual camera.

15. The method of claim 12, wherein the stimuli data comprises internal and external stimuli data.

16. The method of claim 12, wherein the stimuli data correspond to real world stimuli.

17. The method of claim 12, wherein the stimuli data corresponds to synthetically generated stimuli.

18. The method of claim 12, wherein functional neurodata frames are representations of brain structure and function, wherein the representations correspond to a recording modality.

19. The method of claim 18, wherein the recording modality comprises any one or more of the following:

Electro-encephalography (EEG);
functional Near-Infrared Spectroscopy (fNIRS);
Magneto-encephalography (MEG);
functional Magnetic Resonance Imaging (fMRI);
functional Ultrasound (fUS);
Electron Microscopy;
Expansion Microscopy;
Histological Data;
MEA Spike Trains; or
$Ca^{2+}$ Imaging (or Fluorescence imaging).

20. The method of claim 12, wherein the data acquisition module is configured to collect functional datasets, aligned function/behavior datasets, structural datasets and aligned structure/function datasets based on the acquisition plan.

21. The method of claim 12, wherein the output behaviors comprise one or more of the following:

generating textual output;
generating image output;
generating video output;
generating actions or commands to maneuver a simulated person; or
generating speech.

22. The method of claim 21, wherein a portion of the output behaviors is input back into the brain state module, to generate new output.

* * * * *